United States Patent [19]

Shiraishi et al.

[11] Patent Number: 5,172,412
[45] Date of Patent: Dec. 15, 1992

[54] SUBSCRIBER CIRCUIT CAPABLE OF SUPPRESSING IN-PHASE INDUCED NOISE

[75] Inventors: Osamu Shiraishi; Shigeru Hozumi, both of Tokyo, Japan

[73] Assignee: Oki Electric Industry Co., Ltd., Tokyo, Japan

[21] Appl. No.: 567,079

[22] Filed: Aug. 14, 1990

[30] Foreign Application Priority Data

Aug. 15, 1989 [JP] Japan .................. 1-209668

[51] Int. Cl.⁵ ............................ H04M 1/76
[52] U.S. Cl. .................................. 379/416
[58] Field of Search ......... 379/399, 398, 413, 322, 379/324, 345, 416, 377, 405

[56] References Cited

U.S. PATENT DOCUMENTS

| | | | |
|---|---|---|---|
| 1,544,737 | 5/1924 | Green | 379/416 X |
| 3,932,713 | 1/1976 | Fleuchaus et al. | 379/415 |
| 3,993,880 | 11/1976 | O'Neill | 379/413 X |
| 4,007,335 | 2/1977 | Hetherington et al. | 379/413 |
| 4,041,252 | 8/1977 | Cowden | 379/405 |
| 4,079,208 | 3/1978 | Rogers et al. | 379/385 X |
| 4,088,843 | 5/1978 | Rogers et al. | 379/395 X |
| 4,283,604 | 8/1981 | Chambers, Jr. | 379/413 |
| 4,357,494 | 11/1982 | Chambers, Jr. | 379/398 X |
| 4,375,015 | 2/1983 | Chambers, Jr. | 379/345 |
| 4,491,700 | 1/1985 | Tahara et al. | 379/345 X |
| 4,679,132 | 7/1987 | Jirka | 379/413 X |
| 4,852,162 | 7/1989 | Taya et al. | 379/399 X |
| 4,893,332 | 1/1990 | Brown | 379/413 X |

FOREIGN PATENT DOCUMENTS 0163275 12/1985 European Pat. Off. ............ 379/416

OTHER PUBLICATIONS

Paul Horowitz et al., "The Art of Electronics," 2nd Ed. (1989), pp. 49-52.
"LSI For Telephone Subscriber Line Interface Now In A Practical Stage", *Nikkei Electronics*, May 10th, 1982, pp. 127-148.

Primary Examiner—James L. Dwyer
Assistant Examiner—M. Shehata
Attorney, Agent, or Firm—Spencer, Frank & Schneider

[57] ABSTRACT

A subscriber circuit has, in a subscriber line section thereof an in-phase induced noise suppressing circuit which is made up of two series connections of a capacitor and a non-linear element. When an intermittent high-voltage signal is being propagated on another subscriber loop, the noise suppressing circuit suppresses it to thereby prevent it from being transmitted to terminal equipment as noise. Since the degree of suppression of the in-phase induced noise can be limited as desired, the subscriber circuit is advantageously applicable to terminal equipment or line equipment having a line interface implemented as an LSI integrated circuit.

12 Claims, 2 Drawing Sheets

SUBSCRIBER CIRCUIT CAPABLE OF SUPPRESSING IN-PHASE INDUCED NOISE

BACKGROUND OF THE INVENTION

1. Field of the Invention

The present invention relates to a subscriber circuit and, more particularly, to a subscriber circuit which is connected by a pair of subscriber lines to terminal equipment, such as a telephone.

2. Description of the Prior Art

A telephone switch or central office feeds DC transmission current, monitors the conditions of subscriber line loops, converts two-wire and four-wire signals, and serves other various functions. Implementing subscriber circuits at such a telephone switch with LSI technology has recently become practical. LSI technology has heretofore been proposed in relation to subscriber circuits are disclosed in, for example, "LSI for Telephone Subscriber Line Interface Now in a Practical Stage", Nikkei Electronics, May 10, 1982. As taught in this document, a subscriber circuit in the form of an LSI integrated circuit is achievable by use of current mirror type circuitry. This type of circuitry is simple and has only a small number of elements, so that a small chip can be loaded with a great number of functions.

The subscriber circuit is connected to terminal equipment by a pair of subscriber lines. Usually, several to several hundred pairs of subscriber lines are bundled together and laid as a subscriber cable. Hence, various kinds of electric signals propagate through the subscriber cable, depending on the conditions of the individual terminal equipment connected to the subscriber lines. Assume that a high-voltage signal is fed from a certain subscriber circuit to the associated terminal equipment. Then, the high-voltage signal causes a sharp change in the potential within the cable, and such a change in potential is applied to the other pairs of subscriber lines accommodated in the cable as in-phase induced noise via interline capacitance and inductance. To cope with this problem, it has been customary to provide an LSI subscriber circuit with a noise suppressing circuit which, on detecting in-phase noise, outputs a suppressing current proportional to the amplitude of the detected noise to thereby suppress a change in voltage ascribable to the noise.

The prior art circuit described above has an unsolved problem, as follows. Assume that the in-phase induced noise has a great amplitude and cannot be removed unless the suppressing current exceeds the line DC current. Then, a current mirror circuit, which cannot reverse the direction of the current, is unable to routinely suppress the potential change on the subscriber lines, routinely whereby a differential voltage is developed on the lines. As a result, noise is transmitted to the terminal equipment connected to the subscriber lines and the terminal equipment connected to the telephone switch.

SUMMARY OF THE INVENTION

It is therefore an object of the present invention to provide a subscriber circuit which is capable of removing even in-phase induced noise having great amplitude.

In accordance with the present invention, a subscriber circuit connected to communication equipment by a pair of subscriber lines for feeding a transmission current to the communication equipment comprises an in-phase induced noise suppressing circuit comprising a first and a second series connection of a capacitor and a non-linear element. The in-phase induced noise suppressing circuit is connected at one end to the subscriber lines and at the other end to either one of a power source and ground.

When in-phase induced noise having a great amplitude is applied to the subscriber circuit, the in-phase induced noise suppressing circuit suppresses the noise to a predetermined voltage and outputs a current proportional to the amplitude of the voltage of the so-suppressed noise.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENT

Figure 1:
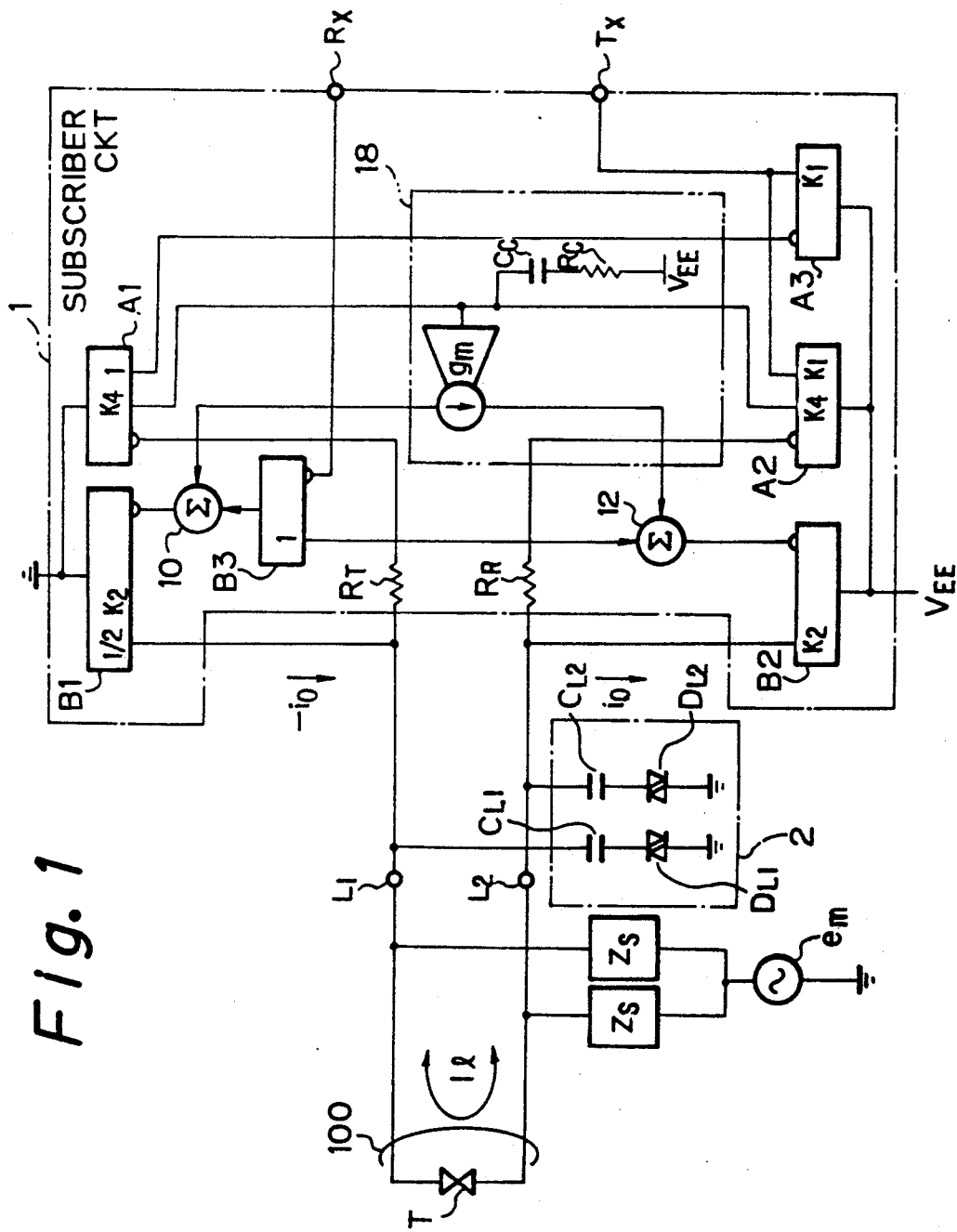
FIG. 1 is a block diagram schematically showing a subscriber circuit embodying the present invention.

Referring to FIG. 1 of the drawings, a subscriber circuit embodying the present invention is shown. The illustrative embodiment is implemented as a subscriber line interface circuit which may be installed in a telephone switch to feed current to a telephone terminal interconnected to the switch. As shown, the subscriber circuit is generally made up of an LSI subscriber circuit 1 and an in-phase induced noise suppressing circuit 2 for suppressing in-phase noise having a great amplitude.

The subscriber circuit 1 is connected to a pair of subscriber lines 100 via subscriber line terminals $L_1$ and $L_2$. The subscriber lines 100 are in turn connected to a telephone set or similar subscriber terminal T. The subscriber circuit 1 has current mirror circuits and plays the role of an LSI subscriber line interface for feeding current to the telephone terminal T stably. Impedances Zs are shown connected to the terminals L1 and L2 of the subscriber lines 100 to represent the of in-phase noise impedance particular to the subscriber lines 100. In-phase induced noise em is shown as being connected to the impedance Zs and is representative of, for the sake of illustration, the voltage of an in-phase induced current acting on the subscriber lines 100.

Specifically, the subscriber circuit 1 has current mirror circuits A1 to A3 and current mirror circuits B1 to B3. The current mirror circuit B1 has an output with a gain of $\frac{1}{2} \cdot K_2$ connected to the terminal L1, while the current mirror circuit B2 has its output with a gain of $K_2$ connected to the terminal L2. The current mirror circuits B1 and B2 are connected to ground and a negative power source Vee, respectively, thereby feeding DC to the subscriber loop. The inputs of the mirror circuits B1 and B2 are connected to adders 10 and 12, respectively.

The adder 10 is connected to the output of the current mirror circuit B3 and the output of a voltage-to-current conversion amplifier gm. The adder 12 is connected to the unity-gain output of the current mirror circuit B3 and the output of the amplifier gm. The input of current mirror circuit B3 is connected to a receive input terminal Rx to which communication current, a voice signal, and so forth are applied. The signal supplied to the receive input terminal Rx is fed out to the subscriber loop 100 as a differential signal by way of the current mirror circuits B3, B1 and B2.

The current mirror circuit A1, like the circuit B1, is connected to ground, and its input is connected to the terminal L1 via a resistor Rt adapted for the detection of a loop voltage. The current mirror circuit A2, like the circuit B2, is connected to the power source, and its input is connected to the terminal L2 via a resistor Pr which is also adapted for the detection of a loop voltage. The current mirror circuit A1 has outputs whose gains are $K_4$ and 1, while the current mirror circuit A2 has outputs whose gains are $K_4$ and $K_1$. The current mirror circuits A1 and A2 constitute in combination a circuit for detecting in-phase noise on the subscriber lines 100 and have the gain $K_4$ outputs thereof connected to each other.

The unity-gain output of the current mirror circuit A1 is connected to the input of the current mirror circuit A3, which is connected to the power source Vee. The gain $K_1$ output of the current mirror circuit A2 is connected to the gain $K_1$ output of the current mirror circuit A3. The gain $K_1$ outputs of the current mirror circuits A2 and A3 are connected to a transmit output terminal Tx as well, so that a loop voltage detection signal and other signals received from the subscriber lines 100 are applied to the terminal Tx.

When in-phase induced noise is applied to the subscriber lines 100, the voltage-to-current conversion amplifier gm delivers a current proportional to the amplitude of the noise to the adders 10 and 12. The input of the amplifier gm is connected to the gain $K_4$ outputs of the current mirror circuits A1 and A2 and to a series connection of a capacitor Cc and a resistor Rc. Constituting an in-phase signal component terminating circuit in combination, the capacitor Cc and resistor Rc are connected to the amplifier gm and to the negative power source Vee, respectively. The in-phase noise component terminating circuit and amplifier gm constitute an in-phase noise suppressing circuit 18.

Assume that in-phase induced noise is applied to the pair of subscriber lines 100, producing a difference between the output currents of the current mirror circuits $A_1$ and $A_2$ having the gain $K_4$. Then, the difference in current is routed through the in-phase signal component terminating circuit with the result that the input voltage to the amplifier gm is changed. In response, the amplifier gm delivers a current proportional to the amplitude of the in-phase noise to the current mirror circuits B1 and B2 via the adders 10 and 12, respectively. Consequently, the current mirror circuits B1 and B2 each feed to the subscriber lines 100 an in-phase noise suppressing current $i_o$ for cancelling in-phase noise whose amplitude does not exceed the DC loop current Il which flows through the subscriber line 100.

On the other hand, the in-phase noise suppressing circuit 2 suppresses in-phase induced noise which may be applied to the subscriber lines 100 and which has an amplitude that exceeds the DC loop current Il, thereby preventing the noise from being propagated to the communicating parties. Connected to the line section of the subscriber circuit 1, the suppressing circuit 2 has a series connection of a capacitor $C_{l1}$ and a non-linear element $D_{l1}$ and a series connection of a capacitor $C_{l2}$ and a non-linear element $D_{l2}$.

The capacitors $C_{l1}$ and $C_{l2}$ are connected to the line terminals L1 and L2, respectively. The non-linear elements $D_{l1}$ and $D_{l2}$ are individually connected to ground. Concerning the capacitors $C_{l1}$ and $C_{l2}$, are used capacitors having a relatively large capacity in order to successfully absorb even sharp changes in voltage. The operating voltage of the non-linear elements $D_{l1}$ and $D_{l2}$ is selected in consideration of the amplitude of the communication signals which may be sent over the subscriber lines 100 as well as the operating characteristic of the in-phase noise suppressing circuit 18.

While the non-linear elements $D_{l1}$ and $D_{l2}$ are shown as being implemented as bidirectional elements, they may be replaced with one-directional elements, if desired. Also, the non-linear elements $D_{l1}$ and $D_{l2}$ may of course be connected to a negative power source, for example, instead of ground as illustrated.

In practice, several to several hundred pairs of subscriber lines 100 are accommodated in a single subscriber cable, and a particular electric signal is propagated on each of the pairs of subscriber lines 100. A signal having a relatively high voltage and propagated on a certain pair of subscriber lines 100 causes the potentials of the other pairs of subscriber lines 100 sharing the same cable to fluctuate. Such a change in potential appears as in-phase induced noise em in the LSI subscriber circuit 1 via the interline capacitance and inductance. More specifically, the in-phase induced noise em is applied to the line terminals L1 and L2 via the in-phase induced noise impedances Zs and from there to the subscriber circuit 1.

When the pair of subcriber lines 100 is free from the influence of potential changes by the other subscriber lines 100, the voltages appearing at the line terminals L1 and L2 are maintained at symmetrical potentials with respect to $\frac{1}{2}$·Vee. In this condition, the currents flowing through the gain $K_4$ outputs of the current mirror circuits A1 and A2 are equal to each other. However, once an in-phase induced noise acts on the pair of subscriber lines 100, the potentials at the line terminals L1 and L2 are shifted in the same direction. As a result, the input currents to the current mirror circuits A1 and A2 and, therefore, the output currents thereof having the gain $K_4$ become different from each other.

Assume that the in-phase induced voltage em is lower than the operating voltage of the in-phase induced noise suppressing circuit 2. Then, a current representative of the difference between the gains $K_4$ of the current mirror circuits A1 and A2 flows through the capacitor Cc and resistor Rc of the in-phase noise suppressing circuit 18. Consequently, the input voltage to the amplifier gm is changed with the result that the amplifier gm produces a current proportional to the amplitude of the in-phase noise.

Such an output current of the amplifier gm is fed to the adders 10 and 12 and thereby added to the current which is applied to the current mirror circuits B1 and B2 via the receive input terminal Rx. As a result, the in-phase noise reducing current $i_0$, in which one of the outputs of the current mirror circuits B1 and B2 increases and the other decreases is fed to the subscriber lines 100. The current $i_0$ suppresses the potential change ascribable to the in-phase noise and thereby prevents the noise derived from the potential change of the subscriber lines 100 from being sent out via the output terminal Tx.

Figure 2A:
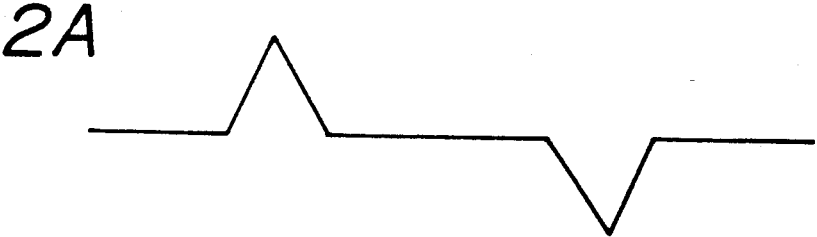
FIGS. 2A and 2B show specific waveforms useful for understanding the operation of an in-phase induced noise suppressing circuit included in the illustrative embodiment.

When a calling signal or similar high-voltage signal propagates through a certain pair of subscriber lines sharing a single cable with the others, it sometimes happens that an in-phase induced noise em which is higher than the operating voltage of the in-phase induced noise suppressing circuit 2 is generated in the pair subscriber lines 100 of interest. This is shown in FIG. 2A. Such in-phase induced noise em causes a current to flow through the capacitors $C_{l1}$ and $C_{l2}$ and non-linear elements $D_{l1}$ and $D_{l2}$ of the in-phase induced noise suppressing circuit 2 via the induced impedance Zs. It follows that the voltages appearing at the line terminals L1 and L2 are substantially limited to the operating voltage of the non-linear elements $D_{l1}$ and $D_{l2}$, as shown in FIG. 2B.

Figure 2B:
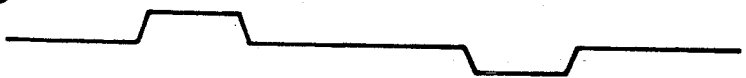

The voltage shown in FIG. 2B are controllable by the in-phase noise suppressing circuit 18 included in the subscriber circuit 1. Hence, the in-phase noise suppressing current $i_0$ generated by the subscriber circuit 1 as stated earlier cancels the noise.

In other words, the in-phase noise currents em inputted via the line terminals L1 and L2 are monitored by the current mirror circuits A1 and A2. If there is a potential difference therebetween, the voltage-to-current conversion amplifier gm outputs a current proportional to the potential difference to the subscriber lines 100 through the adder 10 and the current mirror circuit B1 or through the adder 12 and the current mirror circuit B2. Thus, an in-phase induced noise voltage induced on the subscriber lines 100 can be suppressed.

As stated above, when in-phase induced noise em having a substantial amplitude is applied to the subscriber lines 100, the illustrative embodiment having the in-phase induced noise suppressing circuit 2 is capable of limiting the potential change of the subscriber lines 100 connected to the subscriber circuit 1 to the operating voltages of the non-linear elements $D_{l1}$ and $D_{l2}$ of the circuit 2. Hence, the in-phase induced noise in the subscriber circuit 1 is suppressed up to the range associated with the in-phase noise suppressing capacity of the circuit 1. The illustrative embodiment, therefore, desirably suppresses in-phase induced noise and thereby stabilizes the communication line.

In summary, in accordance with the present invention, an LSI subscriber circuit has in its subscriber line section an in-phase induced noise suppressing circuit which is made up of capacitors and non-linear elements. The subscriber circuit, therefore, is capable of suppressing a greater amount of in-phase induced noise than the prior art, thereby preventing an intermittent high-voltage signal that is being propagated on another pair of subscriber lines from being sent to terminal equipment as noise. Since the degree of suppression of the noise can be limited as desired, the subscriber circuit is advantageously applicable to terminal equipment or line equipment having a line interface implemented as an LSI integrated circuit.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, the current mirror type circuitry used to implement an LSI subscriber circuit as shown and described may be replaced with any other suitable approach avilable for LSI configuration.

What is claimed is:

1. A subscriber circuit for applying D.C. current to a subscriber terminal via a pair of subscriber lines, comprising:

monitoring means connected to the pair of subscriber lines for detecting an in-phase induced noise voltage induced in the pair of subscriber lines by detecting a potential difference between the subscriber lines;

amplifying means connected to said monitoring means for generating an output current proportional to the potential difference detected by said monitoring means;

feed voltage control means connected to said amplifying means for suppressing the in-phase induced noise voltage by adjusting current fed to the subscriber lines proportional to the output current from said amplifying means; and in-phase induced noise suppressing means for suppressing an in-phase induced noise voltage of large amplitude induced in the subscriber lines, said in-phase induced noise suppressing means including a pair of circuits each having a capacitor and a non-linear element connected in series, each capacitor being connected to a respective one of subscriber lines, and said non-linear elements being connected to ground or a negative potential source.

2. A subscriber circuit according to claim 1, wherein the monitoring means, amplifying means, and feed voltage control means are included in an LSI integrated circuit.

3. A subscriber circuit for supplying D.C. current to a subscriber terminal via a pair of subscriber lines, comprising:

a pair of power supplying means respectively connected to the pair of the subscriber lines for supplying D.C. current to the subscriber terminal;

in-phase induced noise detecting means for detecting an in-phase induced noise voltage induced in the pair of subscriber lines by detecting a potential difference between the pair of subscriber lines;

noise suppressing means connected to said in-phase induced noise detecting means for suppressing the in-phase induced noise induced in the pair of subscriber lines by controlling said pair of power supplying means; and in-phase induced noise suppressing means for suppressing an in-phase induced noise voltage of large amplitude induced in the subscriber lines, said in-phase induced noise suppressing means including a pair of circuits each including a capacitor and a non-linear element connected in series, each capacitor being connected to a respective one of subscriber lines, and said non-linear elements being connected to ground or a negative power source.

4. A subscriber circuit according to claim 3, wherein said noise suppressing means comprises:

converting means connected to said in-phase induced noise detecting means for converting the detected potential difference to a control voltage; and amplifying means connected to said converting means for generating an output current proportional to the control voltage and for supplying the output current to said pair of power supplying means.

5. A subscriber circuit according to claim 3, wherein said in-phase induced noise detecting means comprises a pair of current mirror circuits, respectively connected to a negative potential source or ground, and a pair of resistors, each of said current mirror circuits having an input port that is connected to a respective one of the subscriber lines via a respective one of said resistors, said current mirror circuits additionally having output ports that are connected to each other.

6. A subscriber circuit according to claim 5, wherein said noise suppressing means comprises converting means, connected to the output ports of said current mirror circuits, for connecting the detected potential difference to a control voltage.

7. A subscriber circuit according to claim 3, wherein said pair of power supplying means, said in-phase induced noise detecting means, and said noise suppressing means are included in an LSI integrated circuit.

8. A subscriber circuit for supplying D.C. current to a subscriber terminal via a pair of subscriber lines, comprising:
   a pair of power supplying means respectively connected to the pair of the subscriber lines for supplying D.C. current to the subscriber terminal;
   in-phase induced noise detecting means for detecting an in-phase induced noise voltage induced in the pair of subscriber lines by detecting a potential difference between the pair of subscriber lines;
   noise suppressing means connected to said in-phase induced noise detecting means for suppressing the in-phase induced noise induced in the pair of subscriber lines by controlling said pair of power supplying means; and
   in-phase induced noise suppressing means for suppressing an in-phase induced voltage of large amplitude induced in the subscriber lines, said in-phase induced noise suppressing means including a capacitor and a non-linear element connected together in a first series circuit having first and second ends, and another capacitor and another non-linear element connected together in a second series circuit having first and second ends, said first end of said first series circuit being connected to one of said subscriber lines, said first end of said second series circuit being connected to the other of said subscriber lines, and said second ends of both series circuits being maintained at a predetermined potential.

9. A subscriber circuit according to claim 8, wherein said predetermined potential is ground potential.

10. A subscriber circuit according to claim 8, wherein said predetermined potential is a negative supply potential.

11. A subscriber circuit according to claim 8, wherein at least one of said non-linear elements is a bi-directional non-linear element.

12. A subscriber circuit according to claim 11, wherein both of said non-linear elements are bi-directional non-linear elements.

* * * * *